US010892452B2

(12) United States Patent
Iwao et al.

(10) Patent No.: US 10,892,452 B2
(45) Date of Patent: Jan. 12, 2021

(54) CELL STRUCTURE UNIT AND MULTILAYER CELL

(71) Applicant: KABUSHIKI KAISHA NIHON MICRONICS, Tokyo (JP)

(72) Inventors: Gouichi Iwao, Tokyo (JP); Makoto Kikuta, Tokyo (JP); Masami Sano, Tokyo (JP)

(73) Assignee: KABUSHIKI KAISHA NIHON MICRONICS, Tokyo (JP)

( * ) Notice: Subject to any disclaimer, the term of this patent is extended or adjusted under 35 U.S.C. 154(b) by 77 days.

(21) Appl. No.: 16/067,322

(22) PCT Filed: Dec. 13, 2016

(86) PCT No.: PCT/JP2016/086991
§ 371 (c)(1),
(2) Date: Jun. 29, 2018

(87) PCT Pub. No.: WO2017/119242
PCT Pub. Date: Jul. 13, 2017

(65) Prior Publication Data
US 2019/0020005 A1      Jan. 17, 2019

(30) Foreign Application Priority Data
Jan. 5, 2016    (JP) .................................. 2016-000513

(51) Int. Cl.
*H01M 2/10* (2006.01)
*H01M 2/26* (2006.01)
(Continued)

(52) U.S. Cl.
CPC ........... *H01M 2/1077* (2013.01); *H01M 2/20* (2013.01); *H01M 2/266* (2013.01); *H01M 10/38* (2013.01);
(Continued)

(58) Field of Classification Search
CPC ...... H01M 2/1077; H01M 2/20; H01M 2/266; H01M 10/38; H01M 10/0413; H01M 10/0436
See application file for complete search history.

(56) References Cited

U.S. PATENT DOCUMENTS

| | | | |
|---|---|---|---|
| 6,881,514 B2 | 4/2005 | Ahn et al. | |
| 2011/0014520 A1 | 1/2011 | Ueda | |
| 2015/0188113 A1* | 7/2015 | Kudoh .................. | H01G 11/76 429/158 |

FOREIGN PATENT DOCUMENTS

| | | |
|---|---|---|
| CN | 102057522 A | 5/2011 |
| CN | 104221200 A | 12/2014 |

(Continued)

OTHER PUBLICATIONS

European Patent Office, Extended European Search Report Issued in Application No. 16883742.5, dated Jun. 13, 2019, Germany, 9 pages.
(Continued)

*Primary Examiner* — Jimmy Vo
(74) *Attorney, Agent, or Firm* — McCoy Russell LLP

(57) ABSTRACT

A cell structure of the present invention includes first and second sheet shaped cells, each including a first electrode and a second electrode, and an insulating member arranged between the first and second sheet shaped cells. Here, the second electrode of the first sheet-shaped cell and the second electrode of the second sheet-shaped cell face each other. The first sheet shaped cell includes a tab portion extended on an XY plane to outside of the second sheet shaped cell and the second sheet shaped cell includes a tab portion extended on the XY plane to outside of the first sheet shaped cell. The second electrodes are connected through a tab lead arranged from the tab portion to the tab portion.

10 Claims, 15 Drawing Sheets

(51) Int. Cl.
*H01M 2/20* (2006.01)
*H01M 10/38* (2006.01)
*H01M 10/04* (2006.01)

(52) U.S. Cl.
CPC .... *H01M 10/0413* (2013.01); *H01M 10/0436* (2013.01)

(56) References Cited

FOREIGN PATENT DOCUMENTS

| | | |
|---|---|---|
| EP | 2838148 A1 | 2/2015 |
| JP | 2003523060 A | 7/2003 |
| JP | 2010108751 A | 5/2010 |
| JP | 2011081925 A | 4/2011 |
| JP | 2012138368 A | 7/2012 |
| JP | 2014038817 A | 2/2014 |
| WO | 2012020699 A1 | 2/2012 |
| WO | 2013153603 A1 | 10/2013 |
| WO | WO-2013154046 A1 * | 10/2013 |
| WO | 2015145783 A1 | 10/2015 |

OTHER PUBLICATIONS

ISA Japan Patent Office, International Search Report Issued in Application No. PCT/JP2016/086991, dated Mar. 14, 2017, WIPO, 4 pages.
State Intellectual Property Office of the People's Republic of China, Office Action and Search Report Issued in Application No. 201680078069.3, dated Jul. 2, 2020, 16 pages. (Submitted with Partial Translation).

* cited by examiner

A cell structure unit according to an aspect of the present embodiment includes a first sheet-shaped cell that includes a first electrode and a second electrode, a second sheet-shaped cell that includes a first electrode and a second electrode and that is arranged as facing the first sheet-shaped cell, and a tab lead that connects the second electrode of the first sheet-shaped cell and the second cell of the second sheet-shaped cell. Here, wherein the second electrode of the first sheet-shaped cell and the second electrode of the second sheet-shaped cell are arranged as facing each other. Further, in a plane view of a state that the first sheet-shaped cell and the second sheet-shaped cell are arranged as facing each other, the first sheet-shaped cell includes a first tab portion arranged as being extended to outside of the second sheet-shaped cell, the second sheet-shaped cell includes a second tab portion arranged as being extended to outside of the first sheet-shaped cell, and the tab lead is arranged from the first tab portion to the second tab portion. Accordingly, thinning can be easily achieved even though the two sheet-shaped cells are layered and connected in parallel.

CELL STRUCTURE UNIT AND MULTILAYER CELL

CROSS-REFERENCE TO RELATED APPLICATIONS

The present application is a U.S. National Phase of International Patent Application Serial No. PCT/JP2016/086991 entitled "BATTERY STRUCTURE AND LAMINATED BATTERY," filed on Dec. 13, 2016. International Patent Application Serial No. PCT/JP2016/086991 claims priority to Japanese Patent Application No. 2016-000513, filed on Jan. 5, 2016. The entire contents of each of the abovementioned applications are hereby incorporated by reference in their entirety for all purposes.

TECHNICAL FIELD

The present invention relates to a cell structure unit and a multilayer cell.

BACKGROUND ART

Patent Document 1 discloses a connection structure of electrode tabs and tab leads in a storage cell such as a lithium ion cell. Patent Document 2 discloses a non-aqueous solid electrolytic cell in which tab leads are connected to a positive electrode and a negative electrode, respectively. In Patent Documents 1 and 2, a tab for a positive electrode and a tab for a negative electrode are arranged as being shifted on a plane view.

CITATION LIST

Patent Literature

Patent Document 1: Japanese Unexamined Patent Application Publication No. 2014-38817
Patent Document 2: Japanese Unexamined Patent Application Publication No. 2011-81925

SUMMARY OF INVENTION

Technical Problem

A layered structure of layering unit cell sheets has been adopted for a cell to increase capacity thereof. In this case, thickness of the cell is increased owing to overlapping of tab portions. Specifically, when two sheets are layered, thickness of the layered structure is increased as being total thickness of the sheets, tab leads, insulating members, conductive joint members, and the like.

Here, when positions of the tab leads are shifted to reduce the thickness, a process to join the tab leads is required and productivity is decreased. Further, when the tab leads are formed into a comb-teeth shape or the like, layering processes become complicated and productivity is decreased.

In view of the above, an object of the present invention is to provide a technology for easy achieving of thinning.

Solution to Problem

In the abovementioned cell structure unit, it is possible that a first insulating member is arranged at the first sheet-shaped cell in the vicinity of the second tab portion and a second insulating member is arranged at the second sheet-shaped cell in the vicinity of the first tab portion. Accordingly, short-circuit can be reliably prevented from occurring between the second electrode and the first electrode.

In the abovementioned cell structure unit, it is preferable that thickness of the tab lead is equal to or smaller than that of each of the first sheet-shaped cell and the second sheet-shaped cell. Accordingly, thinning can be achieved.

In the abovementioned cell structure unit, it is possible that a first layer unit in which an n-type metal oxide semiconductor layer, a charging layer, a p-type metal oxide semiconductor layer, and the second electrode are layered in the order thereof is arranged on the first electrode of the first sheet-shaped cell; and a second layer unit in which an n-type metal oxide semiconductor layer, a charging layer, a p-type metal oxide semiconductor layer, and the second electrode are layered in the order thereof is arranged on the first electrode of the second sheet-shaped cell.

In the abovementioned cell structure unit, it is possible that the first layer unit is arranged on each of both faces of the first electrode of the first sheet-shaped cell, and the second layer unit is arranged on each of both faces of the first electrode of the second sheet-shaped cell. Accordingly, higher-capacity thereof can be obtained.

In the abovementioned cell structure unit, it is possible that a joint member joining the tab lead and the second electrode is further arranged and each thickness of the first sheet-shaped cell and the second sheet-shaped cell are substantially the same as total thickness of the joint member and the tab lead. Accordingly, layering can be easily performed.

A multilayer cell according to an aspect of the present embodiment, a plurality of the abovementioned cell structural units are layered; a plurality of the first tab portions and the second tab portions are arranged in the multilayer cell; the second electrodes are arranged on first faces of the first tab portions, respectively, and insulating layers are arranged on second faces thereof, respectively; and the second electrodes are arranged on first faces of the second tab portions, respectively, and insulating layers are arranged on second faces thereof, respectively. Accordingly, occurrence of short-circuit between the first electrode and the second electrode can be prevented even through the cell structure units are layered.

In the abovementioned multilayer cell, it is possible that, in the two cell structural units adjacent one above the other, the two first tab portions are arranged as facing each other and the two second tab portions are arranged as facing each other. Accordingly, connection to each terminal can be easily performed.

In the abovementioned multilayer cell, it is possible that, in the two cell structural units adjacent one above the other, the two first tab portions are arranged as being shifted from each other and the two second tab portions are arranged as being shifted from each other. Accordingly, thinning can be easily achieved.

In the abovementioned multilayer cell, it is possible that a plurality of the first sheet-shaped cells, a plurality of the second sheet-shaped cells, and a plurality of the tab leads are arranged; joint members that join the tab leads to the second electrodes respectively are arranged; and thickness of each of the first sheet-shaped cells and the second sheet-shaped cells is substantially the same as total thickness of the joint member and the tab lead.

Advantageous Effects of Invention

The present invention can provide a technology for easy achieving of thinning.

DESCRIPTION OF EMBODIMENTS

In the following, examples of embodiments of the present invention will be described with reference to the drawings. The description in the following is simply for preferable embodiments of the present invention and is not intended to limit the scope of the present invention to the following embodiments.

First Embodiment

The present invention relates to a cell structure unit for a sheet-shaped cell and a multilayer cell such as a cell based on a new charging principle (hereinafter, called an oxide semiconductor secondary cell). An oxide semiconductor secondary cell is a secondary cell capable of performing charging-discharging. Specifically, in an oxide semiconductor secondary cell, conductivity of a charging layer is varied by being irradiated with ultraviolet.

Structure of Sheet-Shaped Cell

Figure 1:
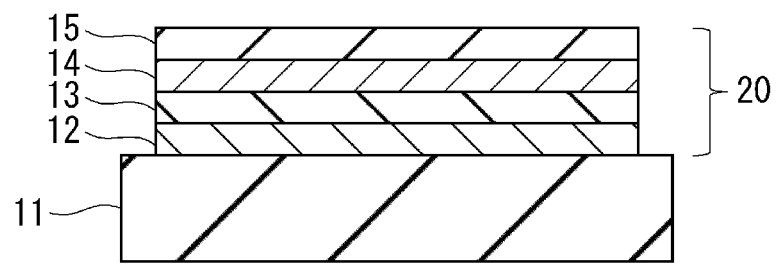
FIG. 1 is a sectional view illustrating a structure of a sheet-shaped cell of a first embodiment.

FIG. 1 is a view illustrating a sectional structure of a sheet-shaped cell 10 in which an oxide semiconductor secondary cell of the present embodiment is formed into a sheet shape.

In FIG. 1, the sheet-shaped cell 10 has a layered structure that an n-type metal oxide semiconductor layer 12, a charging layer 13 to which energy is charged, a p-type metal oxide semiconductor layer 14, and a second electrode 15 are layered on a substrate 11 in the order thereof. Here, a layer structure unit formed on the substrate 11 is called a layer unit 20. That is, the layer unit 20 includes the n-type metal oxide semiconductor layer 12, the charging layer 13, the p-type metal oxide semiconductor layer 14, and the second electrode 15.

The substrate 11 is formed of a conductive material and the like such as a metal and functions as a first electrode. In the present embodiment, the substrate 11 serves as a negative electrode. For example, it is possible to use, for the substrate 11, a metal foil sheet such as an aluminum sheet.

The n-type metal oxide semiconductor layer 12 is formed on the substrate 11. It is possible to use, for example, titanium dioxide ($TiO_2$) as a material of the n-type metal oxide semiconductor layer 12.

It is possible to use n-type metal oxide semiconductor particles as a material of the charging layer 13. The n-type metal oxide semiconductor becomes to the layer having a charge function through photoexcited structural change by being irradiated with ultraviolet. The charging layer 13 is formed of a material including n-type metal oxide semiconductor and an insulting material. It is preferable to use titanium dioxide, tin oxide, or zinc oxide as a material of the n-type metal oxide semiconductor that is capable of being used for the charging layer 13. It is also possible to use a material in which any two or three of titanium dioxide, tin oxide, and zinc oxide are combined.

The p-type metal oxide semiconductor layer 14 is formed on the charging layer 13. It is possible to use nickel oxide (NiO), copper-aluminum oxide ($CuAlO_2$), or the like as a material of the p-type metal oxide semiconductor layer 14.

The second electrode 15 is formed on the p-type metal oxide semiconductor layer 14. The second electrode 15 serves as a positive electrode. A conductive film such as a metal film is used for the second electrode 15. A layered film of chromium and palladium or an aluminum film is formed to lower resistance as the second electrode 15. A metal electrode formed of chromium or copper may be used as the second electrode. A silver alloy film including aluminum or the like may be used as another metal electrode. Examples of a forming method for the above include vapor phase film formation such as sputtering, ion plating, electron beam deposition, vacuum deposition, and chemical deposition. Further, a metal electrode may be formed with an electrolytic plating process, a non-electrolytic plating process, or the like. In general, it is possible to use copper, copper alloy, nickel, aluminum, silver, gold, zinc, tin, or the like as a metal to be used for plating.

Here, in the present embodiment, the layers on the substrate 11 may be arranged in the opposite order. For example, it is possible that the substrate 11 is formed of a conductive material to be a positive electrode and the second electrode 15 serves as a negative electrode. In this case, it is simply required that the n-type metal oxide semiconductor layer 12 and the p-type metal oxide semiconductor layer 14 are replaced with each other. That is, the p-type metal oxide semiconductor layer is located below the charging layer 13 and the n-type metal oxide semiconductor layer is located on the charging layer 13.

Thus, the layer unit 20 including the n-type metal oxide semiconductor layer 12, the charging layer 13, the p-type metal oxide semiconductor layer 14, and the second electrode 15 is arranged on the substrate 11. Accordingly, the second electrode 15 is arranged on the frontmost face of the sheet-shaped cell 10. Here, the layer unit 20 is not extended to a rim portion of the sheet-shaped cell 10. The layer unit 20 is formed on approximately entire face of the substrate 11 except for the rim portion. Accordingly, the substrate 11 is exposed at the rim portion of the sheet-shaped cell 10. In other words, the substrate 11 is exposed at the outside of the layer unit 20 (e.g., at the rim portion of the substrate 11). The substrate 11 is arranged on the frontmost face of the sheet-shaped cell 10 at the rim portion of the sheet-shaped cell 10.

A material in which an insulating material and n-type metal oxide semiconductor are mixed is used as a material of the charging layer 13. In the following, detailed description will be provided on the charging layer 13. For the charging layer 13, silicon oil is used as a material of the insulating material and titanium dioxide is used as a material of the n-type metal oxide semiconductor.

Titanium dioxide, tin oxide, or zinc oxide is used as a material of the n-type metal oxide semiconductor to be used for the charging layer 13. Such n-type metal oxide semiconductor is obtained through decomposition of aliphatic acid salt of the above metals in a manufacturing process. Here, aliphatic acid salt of a metal to be used is capable of being varied into metal oxide through decomposition or burning by being irradiated with ultraviolet under an oxidizing atmosphere or being burnt.

Here, it is preferable that the aliphatic acid salt is salt of aliphatic acid and a metal on the grounds of easiness of being decomposed or burnt with heat, high solvent-solubility, fine composition of a film after being decomposed or burnt, being inexpensive with easy care, easiness of composition of a metal and salt, and the like.

According to a secondary cell of the present embodiment, higher-capacity can be obtained by layering the sheet-shaped cells 10 illustrated in FIG. 1. Specifically, capacity of a secondary cell can be heightened by connecting a plurality of the sheet-shaped cells 10 in parallel. In the present embodiment, the sheet-shaped cells 10 are layered as facing each other. When sheet-shaped cells are mutually stuck as facing each other, conduction between electrodes can be obtained. However, since contact therebetween is unstable, performance is insufficient as an oxide semiconductor secondary cell. In the present embodiment, electrical connection is obtained via tab leads while sandwiching an insulating member between the sheet-shaped cells to obtain reliable conduction. Here, when sheet-shaped cells are layered with an insulating member sandwiched, thickness thereof is increased. The present embodiment discloses a technology to reduce the thickness.

Figure 2:
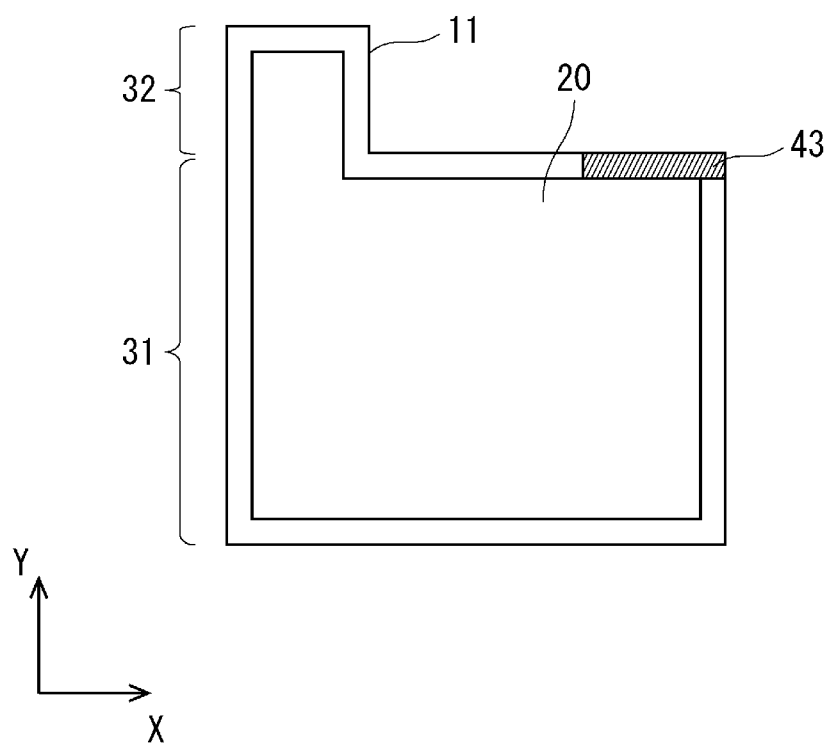
FIG. 2 is an XY plane view illustrating the structure of the sheet-shaped cell of the first embodiment.

In the following, description will be provided with reference to FIG. 2 on a planar shape of the sheet-shaped cell 10 that is preferable for a layer structure having parallel connection. In FIG. 2, an XY plane represents a plane on which the sheet-shaped cell 10 is placed. An X direction and a Y direction are perpendicular to each other.

As illustrated in FIG. 2, the sheet-shaped cell 10 includes a rectangle portion 31 and a tab portion 32. On the XY plane, the rectangle portion 31 is rectangular or square. End sides of the rectangle portion 31 are parallel to the X direction or the Y direction. The rectangle portion 31 is formed into a rectangular shape with a longitudinal direction thereof aligned in the X direction. The tab portion 32 is extended toward +Y side from the rectangle portion 31. That is, the tab portion 32 is extended outward from one end side of the rectangle portion 31. Here, the sheet-shaped cell 10 is formed into an L shape on the XY plane. The tab portion 32 is arranged at an upper-left end part of the rectangle portion 31.

A main portion of the layer unit 20 is arranged on the rectangle portion 31 and the tab portion 32. That is, on the most of the rectangle portion 31 and the tab portion 32, the second electrode 15 is arranged on the frontmost face thereof. The substrate 11 is exposed at a region where the layer unit 20 is not arranged. Thus, the substrate 11 appears as the frontmost face at the rim portion of the sheet-shaped cell 10.

Further, an insulating member 43 is arranged on the sheet-shaped cell 10. As illustrated in FIG. 2, the insulating member 43 is arranged at a part of the rectangle portion 31. Specifically, along the X direction of the rectangle portion 31, the tab portion 32 is arranged at the upper-left end part of the sheet-shaped cell 10 and the insulating member 43 is arranged at an upper-right end part thereof.

The insulating member 43 is arranged outside the layer unit 20. That is, the insulating member 43 is arranged at a region where the substrate 11 appears as the frontmost face. The insulating member 43 is arranged directly on the substrate 11 in contact with the substrate 11. The insulating member 43 is arranged to cover a part of the substrate 11. The insulating member 43 is coated on the substrate 11 with deposition, spray application, or the like. For example, a resin film made of polyimide or the like may be used as the insulating member 43. Preferably, the insulating member 43 is elastic.

Figure 3:
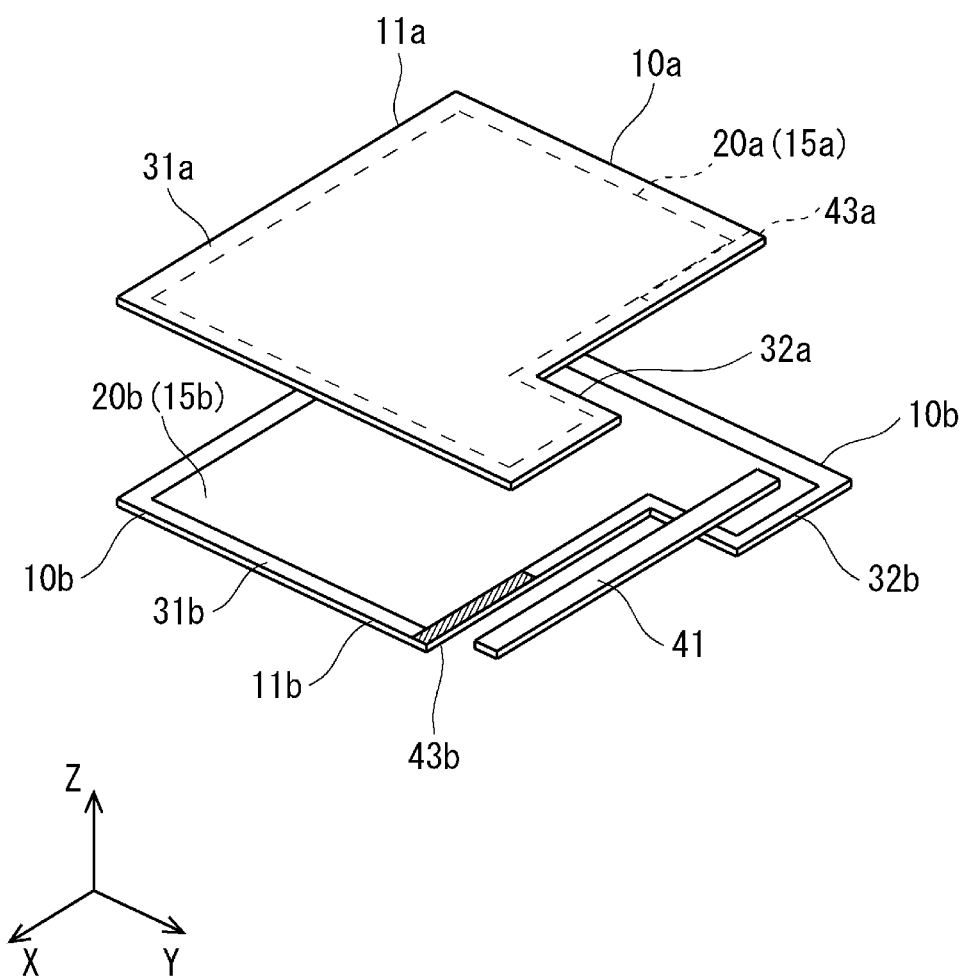
FIG. 3 is an exploded perspective view illustrating a structure of a sheet pair of the first embodiment.

The insulating member 43 is arranged so that the substrate 11 is not short-circuited to a second electrode 15b of another sheet-shaped cell 10b when the sheet-shaped cell 10a is layered thereon (see FIG. 3). A detailed structure of the insulating member 43 will be described later.

Two-Sheets-Layered Cell Structure

Figure 4:
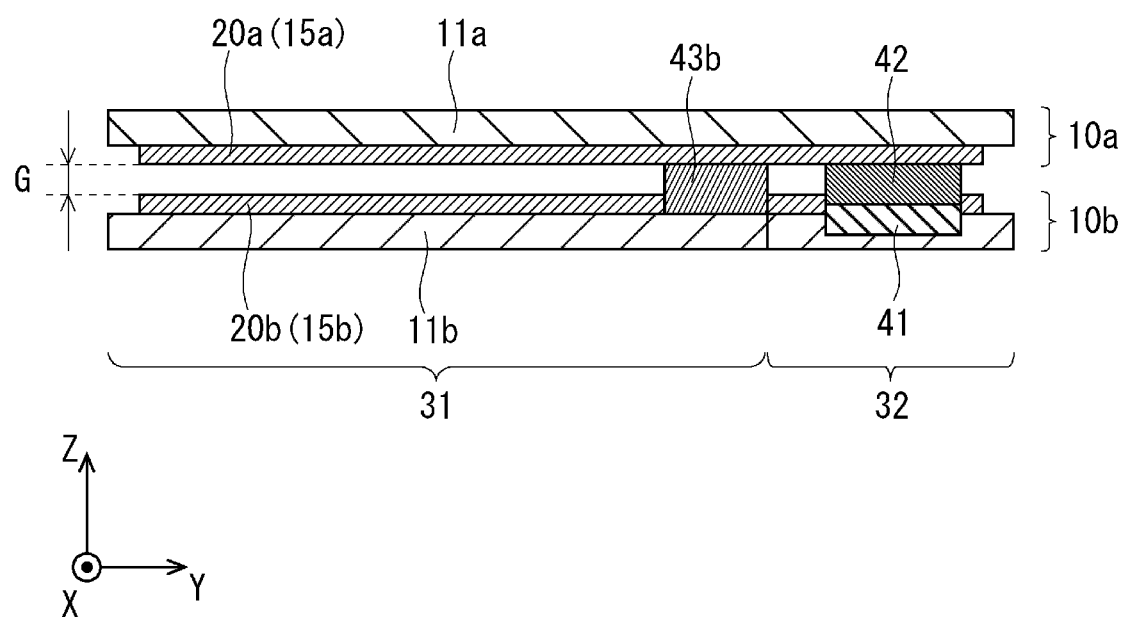
FIG. 4 is a YZ plane view illustrating a side structure of the sheet pair of the first embodiment.
Figure 5:
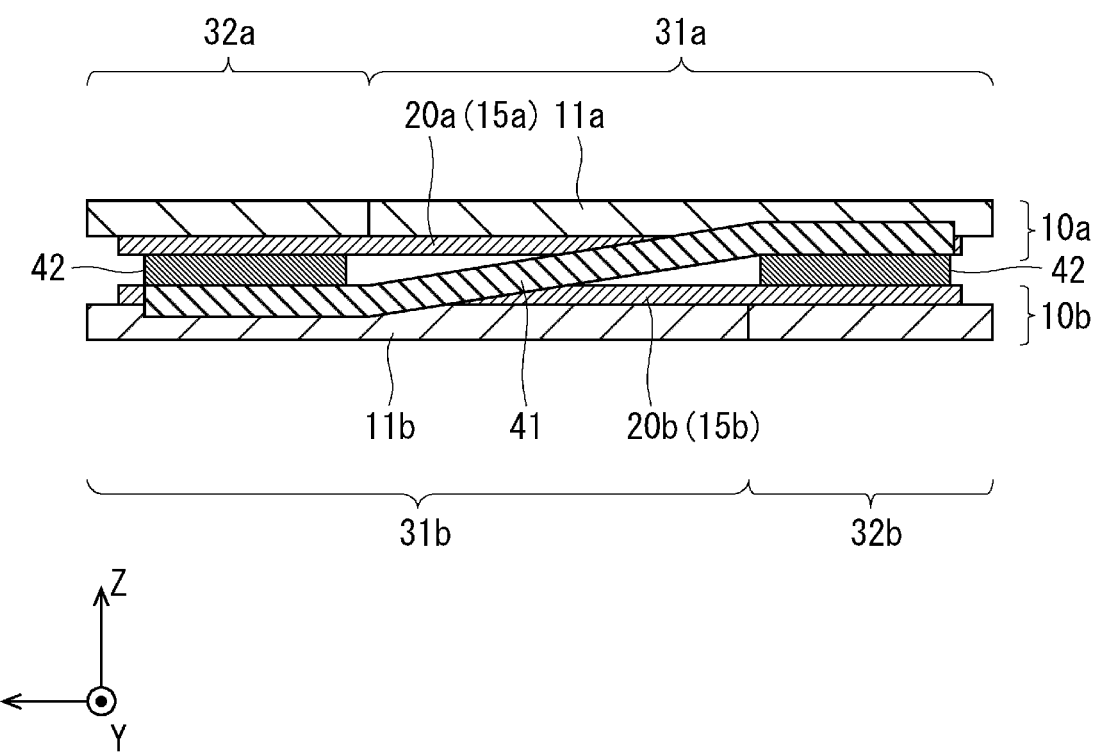
FIG. 5 is an XZ plane view illustrating a side structure of the sheet pair of the first embodiment.
Figure 6:
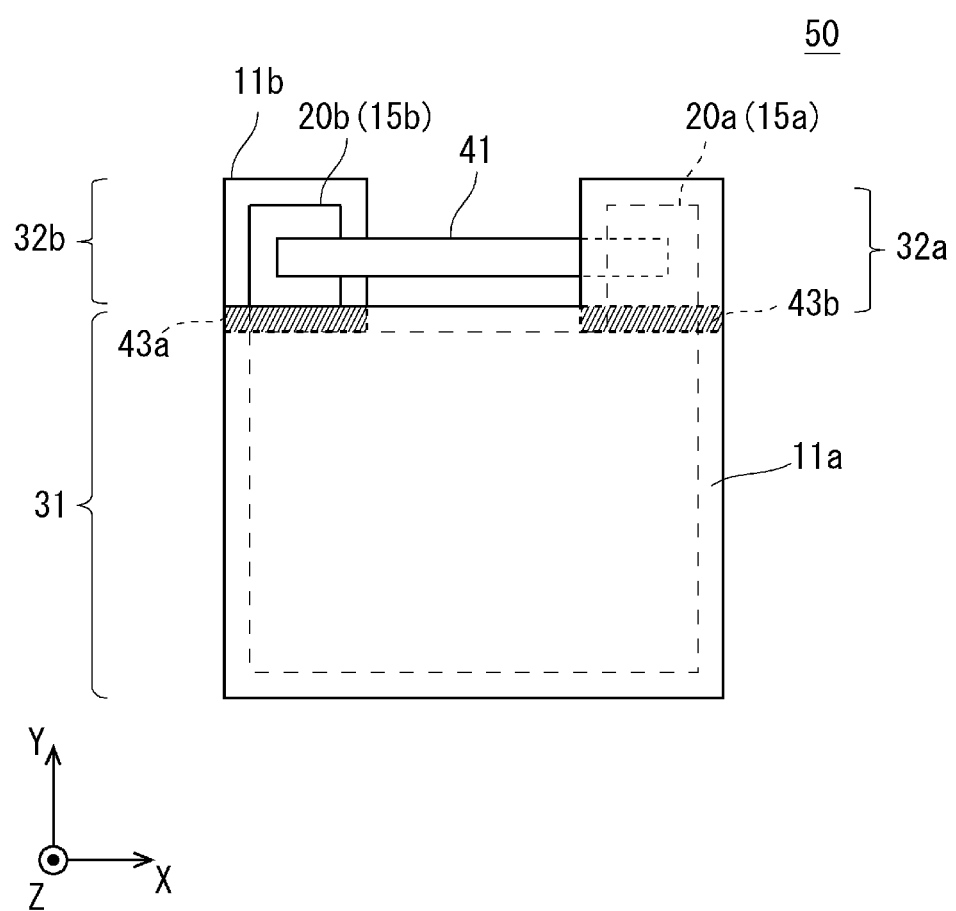
FIG. 6 is an XY plane view illustrating a top structure of the sheet pair of the first embodiment.

Description will be provided on a cell structure unit with the sheet-shaped cells 10a, 10b layered with reference to FIGS. 3 to 6. Hereinafter, the cell structure unit with the two sheet-shaped cells 10 layered is described as a sheet pair 50. FIG. 3 is an exploded perspective view of the sheet pair 50. FIG. 4 is a YZ plane view illustrating a side structure of the sheet pair 50. FIG. 5 is an XZ plane view illustrating a side structure of the sheet pair 50. FIG. 6 is an XY plane view illustrating a top structure of the sheet pair 50.

The sheet pair 50 includes the two sheet-shaped cells 10a, 10b to be coupled. In the sheet pair 50, the two sheet-shaped cells 10 are connected in parallel. In the following drawings, as being similarly to the above, the XY plane represents a plane on which the sheet-shaped cell 10b is placed. Further, a Z direction represents a direction perpendicular to the XY plane. Following description will be provided with an orthogonal coordinate system in which the planar direction of the sheet-shaped cell 10 is oriented in the X direction and the Y direction and the thickness direction of the sheet pair 50 is oriented in the Z direction.

For clear understanding in the present embodiment, one of the two sheet-shaped cells 10 is called the sheet-shaped cell 10a and the other thereof is called the sheet-shaped cell 10b. Specifically, the sheet-shaped cell 10a is placed at the upper side (+Z side) with respect to the sheet-shaped cell 10b. Further, the insulating member 43, the rectangle portion 31, the tab portion 32, and the layer unit 20 arranged in the sheet-shaped cell 10a are called an insulating member 43a, a rectangle portion 31a, a tab portion 32a, and a layer unit 20a. Similarly, the insulating member 43, the rectangle portion 31, the tab portion 32, and the layer unit 20 arranged in the sheet-shaped cell 10b are called an insulating member 43b, a rectangle portion 31b, a tab portion 32b, and a layer unit 20b. In the following, for clear understanding, references of both of the layer unit 20 and the second electrode 15 are appropriately added in the drawings.

The sheet pair 50 includes the sheet-shaped cell 10a serving as a first sheet-shaped cell and the second sheet-shaped cell serving as a second sheet-shaped cell. A tab portion 30a of the sheet-shaped cell 10a serves as a first tab portion and a tab portion 32b of the sheet-shaped cell 10b serves as a second tab portion. Similarly, an insulating member 43a arranged at the sheet-shaped cell 10a serves as a first insulating member and an insulating member 43b arranged at the sheet-shaped cell 10b serves as a second insulating member.

The sheet-shaped cells 10a, 10b are arranged so that the second electrodes 15a, 15b face each other. That is, the sheet-shaped cell 10a is arranged with the sheet-shaped cell 10 in FIG. 1 reversed upside down. The second electrode 15a of the sheet-shaped cell 10a is arranged to be oriented to −Z side and the second electrode 15b of the sheet-shaped cell 10b is arranged to be oriented to +Z side. As illustrated in FIGS. 4 and 5, the layer unit 20a of the sheet-shaped cell 10a is arranged at the lower side and the layer unit 20b of the sheet-shaped cell 10b is arranged at the upper side.

Since the sheet-shaped cell 10a is reversed, the tab portion 32a and the tab portion 32b are arranged as being shifted on the XY plane. That is, the tab portion 32a is arranged at an end on +X side of the sheet-shaped cell 10a and the tab portion 32b is arranged at an end on −X side of the sheet-shaped cell 10b. Thus, the position of the tab portion 32a in the X direction is different from that of the tab portion 32b, so that the tab portion 32a and the tab portion 32b are deviated. Here, the tab portion 32a of the sheet-shaped cell 10a is arranged to be extended to the outside of the rectangle portion 31a on the XY plane. Similarly, the tab portion 32b of the sheet-shaped cell 10b is arranged to be extended to the outside of the rectangle portion 31b on the XY plane.

A tab lead 41 is arranged from the tab portion 32a to the tab portion 32b. The second electrode 15a of the sheet-shaped cell 10a and the second electrode 15b of the sheet-shaped cell 10b are connected via the tab lead 41. The tab lead 41 is extended in the X direction from the tab portion 32a to the tab portion 32b. The tab lead 41 is formed of a conductive sheet, metal foil, or the like with its longitudinal direction oriented in the X direction.

As illustrated in FIG. 5, joint members 42 are arranged at both ends of the tab lead 41. For example, the joint members 42 are made of a conductive paste or a conductive film. The tab leads 41 are joined to the tab portions 32a, 32b respectively through the joint members 42. As illustrated in FIG. 5, the joint member 42 joins a lower face of the layer unit 20a of the tab portion 32a to the tab lead 41. Further, the joint member 42 joins an upper face of the layer unit 20b of the tab portion 32b to the tab lead 41. In other words, the tab lead 41 is arranged from the lower face of the tab portion 32a to the upper face of the tab portion 32b. Thus, the second electrode 15a of the sheet-shaped cell 10a and the second electrode 15b of the sheet-shaped cell 10b are electrically connected via the tab lead 41.

The insulating member 43b is arranged on an upper face of the sheet-shaped cell 10b. The insulating member 43b is arranged in the vicinity of the tab portion 32a. The insulating member 43b is arranged at an end of the sheet-shaped cell 10b. Here, the vicinity represents, for example, a region at which the layer unit 20b of the sheet-shaped cell 10b is not arranged and which corresponds to the tab portion 32a. The insulating member 43b is arranged between the sheet-shaped cell 10a and the sheet-shaped cell 10b at a region extending to the tab portion 32a of the sheet-shaped cell 10a. In other words, the insulating member 43b is arranged at a region of the rectangle portion 31a in the boundary between the tab portion 32a and the rectangle portion 31a of the sheet-shaped cell 10a on the XY plane. Thus, the insulating member 43b is located between the second electrode 15a arranged at the frontmost face of the layer unit 20a in the vicinity of the tab portion 32a and a substrate 11b of the sheet-shaped cell 10b. Accordingly, short-circuit can be prevented from occurring between the second electrode 15a of the sheet-shaped cell 10a and a first electrode 11b of the sheet-shaped cell 10b.

Further, as illustrated in FIGS. 3 and 6, the insulating member 43a is arranged on a lower face of the sheet-shaped cell 10a. The insulating member 43a is arranged in the vicinity of the tab portion 32b. The insulating member 43a is arranged at an end of the sheet-shaped cell 10a. The insulating member 43a is arranged in a similar manner as the insulating member 43b. Thus, the insulating member 43a is arranged between the substrate 11a of the sheet-shaped cell 10a and the layer unit 20 of the sheet-shaped cell 10b.

Specifically, the insulating member 43a is arranged at a region at which the layer unit 20a of the sheet-shaped cell 10a is not arranged and which corresponds to the tab portion 32b. The insulating member 43a is arranged between the sheet-shaped cell 10a and the sheet-shaped cell 10b at a region extending to the tab portion 32b of the sheet-shaped cell 10b. In other words, the insulating member 43a is arranged at a region of the rectangle portion 31b in the boundary between the tab portion 32b and the rectangle portion 31b of the sheet-shaped cell 10b on the XY plane.

Thus, the insulating member 43a is located between the second electrode 15b arranged at the frontmost face of the layer unit 20b in the vicinity of the tab portion 32b and the substrate 11 of the sheet-shaped cell 10a. Accordingly, short-circuit can be prevented from occurring between the second electrode 15a of the sheet-shaped cell 10a and the substrate (a first electrode) 11a of the sheet-shaped cell 10b.

As described above, the tab portion 32a and the tab portion 32b are shifted in position. Accordingly, in the present embodiment, there exists a region, in the boundary between the tab portion 32 and the rectangle portion 31, where the second electrode 15 of one sheet-shaped cell 10 faces the substrate 11 of the other sheet-shaped cell 10. In the present embodiment, the insulating member 43 is arranged at this region. In other words, the insulating member 43 is arranged between the sheet-shaped cell 10a and the sheet-shaped cell 10b at the region where the substrate 11 is exposed. Owing to that the insulating member 43 is arranged at the exposed region, the second electrode 15 can be prevented from being short-circuited to the first electrode of the other sheet-shaped cell 10.

In the above description, the insulating member 43 is arranged at the exposed region of the substrate 11. However, it is not limited to the exposed region of the substrate 11. It is simply required that the insulating member 43 is arranged at a region where the second electrode 15 of one sheet-shaped cell 10 and any layer other (the substrate 11, the n-type metal oxide semiconductor layer 12, the charging layer 13, or the p-type metal oxide semiconductor layer 14) than the second electrode 15 of the other sheet-shaped cell 10 face each other. According to the above, the two sheet-shaped cells 10 can be reliably connected in parallel.

As illustrated in FIG. 4, the insulating member 43 is thicker than each layer unit 20. Accordingly, a gap G is formed between the sheet-shaped cell 10a and the sheet-shaped cell 10b. The tab lead 41 and the joint member 42 are arranged between the first sheet-shaped cell 10a and the second sheet-shaped cell 10b. According to the above, thickness of the two sheet-shaped cells 10a, 10b can be reduced and space saving thereof can be achieved.

Further, owing to that the tab lead 41 is formed to have a thickness equal to or smaller than that of the sheet-shaped cell 10, thinning of the sheet pair 50 can be achieved. That is, the tab portion 32 can be formed thinner than the rectangle portion 31. After multiple layering, the tab lead 41 is connected to a positive electrode terminal or the like by ultrasonic welding, resistance welding, or the like. The substrates 11a, 11b are connected to a negative electrode terminal or the like by ultrasonic welding, resistance welding, or the like as well.

Further, owing to that the substrate 11 and the tab lead 41 are formed of flexible material, it is possible to provide flexibility to the sheet pair 50. Further, since a method of layering is simple without having additional surplus processes, cost reduction for manufacturing can be achieved. Further, thinning thereof can be easily achieved. Furthermore, since the two sheet-shaped cells 10 are connected in parallel, it is possible to obtain higher-capacity.

Multilayer Cell

Figure 7:
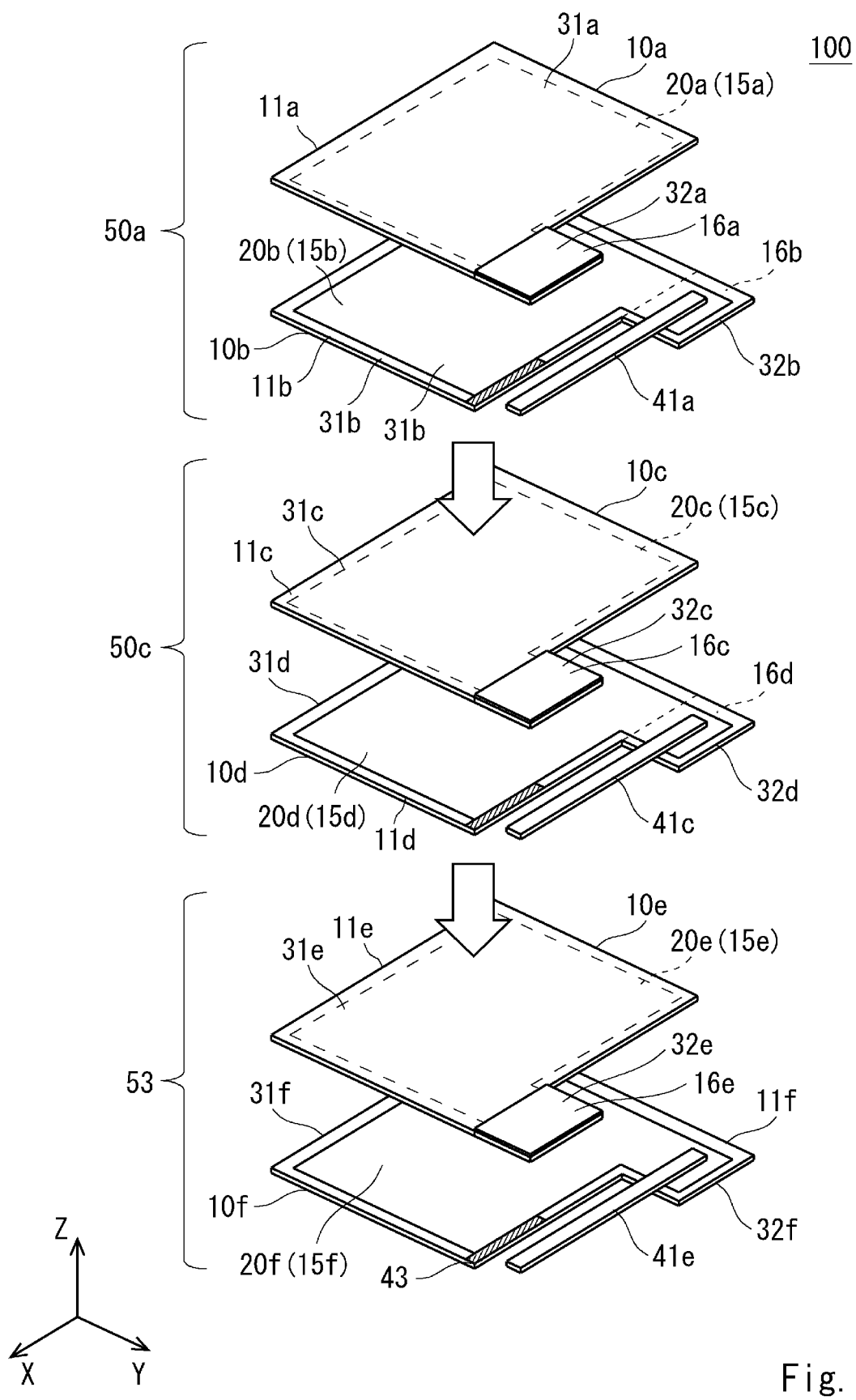
FIG. 7 is an exploded perspective view of a structure of a multilayer cell of the first embodiment.
Figure 8:
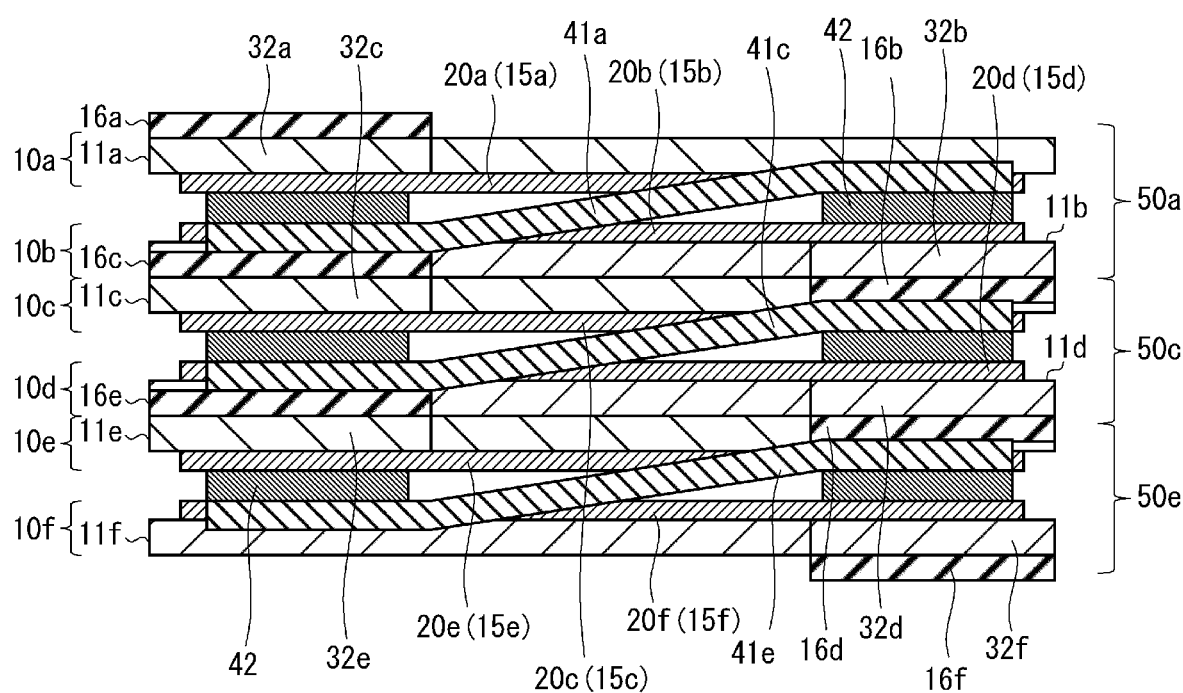
FIG. 8 is an XZ plane view illustrating a side structure of the multilayer cell of the first embodiment.

A multilayer structure in which the abovementioned sheet pairs 50 are layered will be described with reference to FIGS. 7 and 8. FIG. 7 is an exploded perspective view illustrating a structure of a cell having a multilayer structure in which the sheet pairs 50 are layered (hereinafter, called a multilayer cell 100). FIG. 8 is an XZ plane view illustrating the structure of the multilayer cell 100. In FIGS. 7 and 8, three sheet pairs included in the multilayer cell 100 are illustrated as sheet pairs 50a, 50c, 50e. As having the similar structure to the abovementioned sheet pair 50, the sheet pairs 50a, 50c, 50e are illustrated in FIGS. 7 and 8 as being appropriately simplified. Further, description thereof is appropriately skipped to prevent redundant description.

The sheet-shaped cells 10 included in the sheet pair 50a are illustrated as sheet-shaped cells 10a, 10b. Similarly, the sheet-shaped cells 10 included in the sheet pair 50c are illustrated as sheet-shaped cells 10c, 10d and the sheet-shaped cells 10 included in the sheet pair 50e are illustrated as sheet-shaped cells 10e, 10f.

In the present embodiment, tab portions 32a, 32c, 32e of the sheet-shaped cells 10a, 10c, 10e are overlapped on the XY plane and tab portions 32b, 32d, 32f of the sheet-shaped cells 10b, 10d, 10f are overlapped on the XY plane. Tab portions 32 of the sheet-shaped cells 10 adjacent to each other are overlapped.

In the present embodiment, for layering the sheet pairs 50a, 50c, 50e as described above, an insulating layer 16 is arranged on a back face of the tab portion 32. That is, the insulating layer 16 is arranged at the tab portion 32 to prevent the substrate 11 from being short-circuited to the tab lead 41 or the second electrode 15 of another pair sheet 50. Similarly to the insulating member 43, the insulating layer 16 is formed on the back face of the substrate 11 with deposition, spray application, or the like.

Specifically, an insulating layer 16a is arranged on an upper face of the tab portion 32a of the sheet-shaped cell 10a and the layer unit 20a is arranged on a lower face thereof. In contrast, a layer unit 20b is arranged on an upper face of the tab portion 32b of the sheet-shaped cell 10b and an insulating layer 16b is arranged on a lower face thereof. Owing to that the insulating layer 16b is arranged as described above, the substrate 11b at the tab portion 32b can be prevented from being short-circuited to a tab lead 41c or a layer unit 20d at the tab portion 32d.

Similarly, insulating layers 16c, 16e are arranged on upper faces of the tab portions 32c, 32e of the sheet-shaped cells 10c, 10e, respectively, and layer units 20c, 20e are arranged on lower faces thereof, respectively. Further, insulating layers 16d, 16f are arranged on upper faces of the tab portions 32d, 32f of the sheet-shaped cells 10d, 10f, respectively, and layer units 20d, 20f are arranged on lower faces thereof, respectively.

Owing to that the insulating layer 16d is arranged, the substrate 11d at the tab portion 32d can be prevented from being short-circuited to a tab lead 41e or the layer unit 20f at the tab portion 32f. Similarly, owing to that the insulating layer 16c is arranged, the substrate 11c at the tab portion 32c can be prevented from being short-circuited to a tab lead 41a or the layer unit 20a at the tab portion 32a. Further, owing to that the insulating layer 16e is arranged, the substrate 11e at the tab portion 32e can be prevented from being short-circuited to the tab lead 41c or a layer unit 20c at the tab portion 32c.

Thus, regarding two sheet pairs 50 adjacent one above the other, the insulating layer 16 is arranged on the back face of the tab portion 32 in the structure that the tab portions 32 are shifted. According to the above, the substrate (first electrode) 11 exposed to the back face of the tab portion 32 can be prevented from being short-circuited to the tab lead 41 or the second electrode 15.

Further, regarding the sheet-shaped cells 10a to 10f, the rectangle portions 31 are overlapped. Here, regarding the sheet-shaped cell 10b and the sheet-shaped cell 10c, the substrates 11 face each other at the rectangle portions 31. Similarly, regarding the sheet-shaped cell 10d and the sheet-shaped cell 10e, the substrates 11 face each other at the rectangle portions 31. Accordingly, the substrates 11 being the first electrodes can be easily connected. Thus, a plurality of the sheet pairs 50a, 50c, 50e can be easily connected in parallel. Accordingly, productivity of high-capacity multilayer cells can be improved.

After a plurality of the sheet-shaped cells 10 are layered, the tab leads 41 are connected to the positive electrode terminal (not illustrated) by ultrasonic welding, resistance welding, or the like. In the present embodiment, since all the tab portions 32 are extended in the same direction, connection to the positive electrode terminal can be easily performed. Further, after the sheet-shaped cells 10 are layered, the substrates 11 can be connected to the negative electrode terminal (not illustrated) by ultrasonic welding, resistance welding, or the like, as well.

Modified Example of Multilayer Cell

Figure 9:
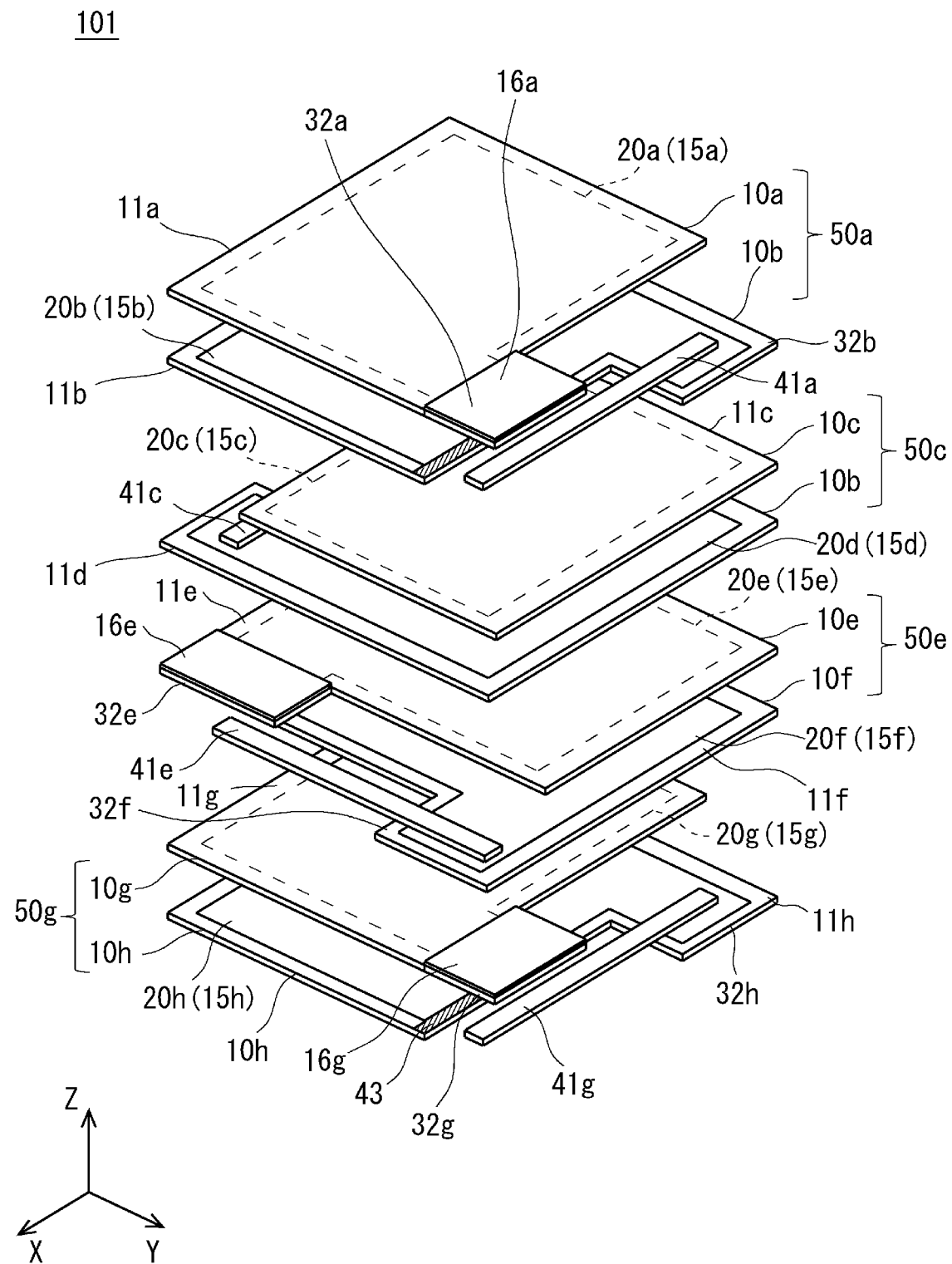
FIG. 9 is an exploded perspective view illustrating a multilayer cell of a modified example.

Description will be provided on a structure of a multilayer cell 101 of a modified example with reference to FIG. 9. FIG. 9 is an exploded perspective view illustrating the structure of the multilayer cell 101 of the modified example. In the modified example, the tab portions 32 of adjacent sheet pairs are shifted in position. Specifically, regarding the adjacent sheet pairs, one sheet pair is rotated by 90 degrees on the XY plane so that the tab portions 32 are shifted in position. Here, since the basic structure of the multilayer cell 101 is similar to that of the multilayer cell 100, redundant description thereof is skipped.

In FIG. 9, four sheet pairs 50 are illustrated as sheet pairs 50a, 50c, 50e, 50g. Since the sheet pairs 50a, 50c, 50e, 50g have the similar structure to the abovementioned sheet pair 50, description is skipped on the detailed structure. Here, the sheet-shaped cells 10 included in the sheet pair 50a are illustrated as sheet-shaped cells 10a, 10b. Similarly, the sheet-shaped cells 10 included in the sheet pair 50c are illustrated as sheet-shaped cells 10c, 10d. The sheet-shaped cells 10 included in the sheet pair 50e are illustrated as sheet-shaped cells 10e, 10f. The sheet-shaped cells 10 included in the sheet pair 50g are illustrated as sheet-shaped cells 10g, 10h.

The sheet pairs 50a, 50c, 50e, 50g are oriented differently from one another. Specifically, the sheet pair 50c is rotated by 180 degrees on the XY plane with respect to the sheet pair 50a. The sheet pair 50e is rotated by 180 degrees on the XY plane with respect to the sheet pair 50a. In the sheet pair 50a, the tab portion 32 is extended in the +Y direction. In the sheet pair 50c, the tab portion 32 is extended in the −Y direction. In the sheet pair 50e, the tab portion 32 is extended in the +X direction. In the sheet pair 50g, the tab portion 32 is extended in the +Y direction as being similar to the sheet pair 50a. Thus, in the multilayer cell 101, the tab portions 32 are extended in three directions.

According to the above, the tab portions 32 of the sheet pairs adjacent one above the other are shifted. Specifically, the tab portions 32a, 32b and the tab portions 32c, 32d are shifted, respectively. Similarly, the tab portions 32e, 32f and the tab portions 32c, 32d are not overlapped, respectively. Further, the tab portions 32e, 32f and the tab portions 32g, 32h are not overlapped, respectively. That is, the adjacent sheet pairs are arranged so that the tab portions 32 thereof are shifted on the XY plane. Accordingly, short-circuit can be reliably prevented from occurring between the substrate (first electrode) 11 and the second electrode 15. Further, since the number of overlapping of the tab portions 32 can be reduced, thinning of the multilayer cell 101 can be achieved as a whole even with a structure that the tab portion 32 is thicker than the rectangle portion 31.

Second Embodiment

Figure 10:
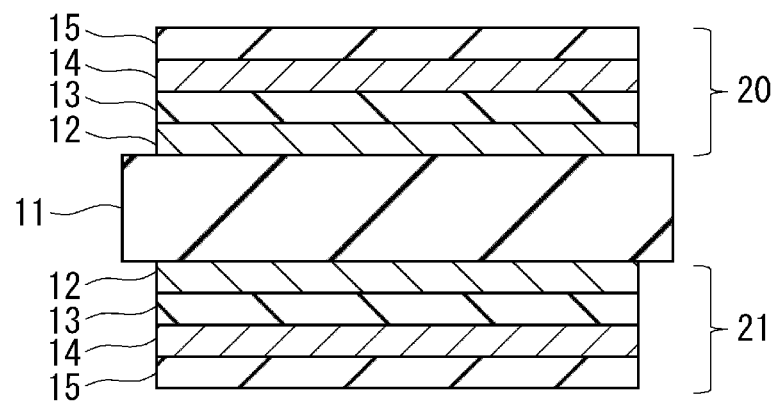
FIG. 10 is a sectional view illustrating a structure of a sheet-shaped cell of a second embodiment.

Description will be provided on a structure of a sheet-shaped cell 10 of an embodiment with reference to FIG. 10. FIG. 10 is a sectional view illustrating a structure of the sheet-shaped cell 10. In the present embodiment, the layer unit 20 and a layer unit 21 are arranged on both faces of the substrate 11, respectively. That is, in addition to the structure in FIG. 1, the layer unit 21 is arranged. The layer unit 20 is arranged on one face of the substrate 11 and the layer unit 21 is arranged on the other face thereof.

Similarly to the layer unit 20, the layer unit 21 includes an n-type metal oxide semiconductor layer 12, a charging layer 13, a p-type metal oxide semiconductor layer 14, and a second electrode 15. Thus, the second electrode layers 15 are arranged on the frontmost face of both faces of the sheet-shaped cell 10, respectively.

Figure 11:
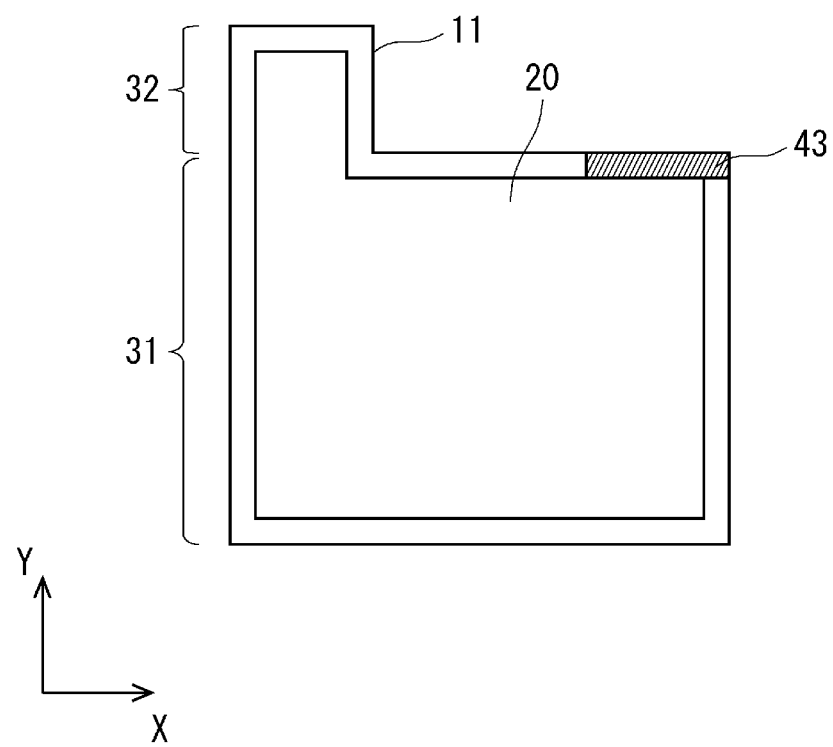
FIG. 11 is an XY plane view illustrating a structure on a front face of the sheet-shaped cell of the second embodiment.
Figure 12:
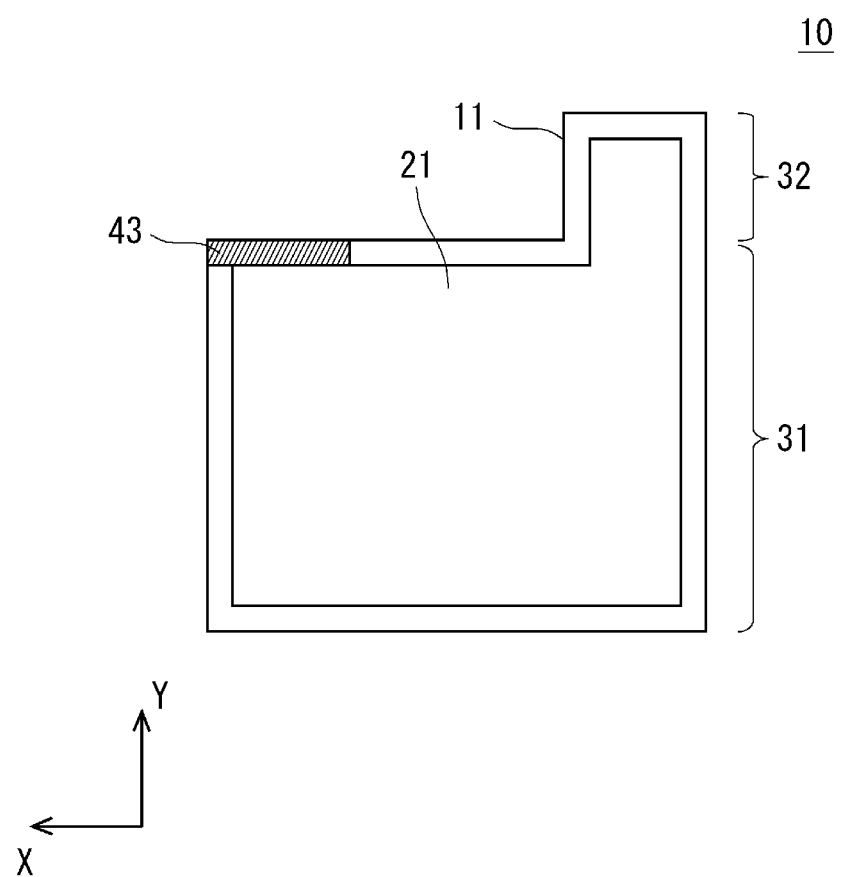
FIG. 12 is an XY plane view illustrating a structure on a back face of the sheet-shaped cell of the second embodiment.

The planar shapes of the sheet-shaped cell 10 are as illustrated in FIGS. 11 and 12. FIG. 11 is an XY plane view illustrating a structure on the front face side of the sheet-shaped cell 10. FIG. 12 is an XY plane view illustrating a structure on the back face side of the sheet-shaped cell 10.

As illustrated in FIGS. 11 and 12, insulating members 43 are arranged on both faces of the sheet-shaped cell 10, respectively. Similarly to the first embodiment, the insulating members 43 are arranged at regions where the layer units 20, 21 are not arranged. Accordingly, each of the insulating members 43 is arranged directly on the corresponding substrate 11 to be contacted thereto. In other words, the insulating member 43 is arranged at a region where the substrate 11 is exposed. The insulating members 43 on both faces are overlapped on the XY plane.

Sheet Pair

Figure 13:
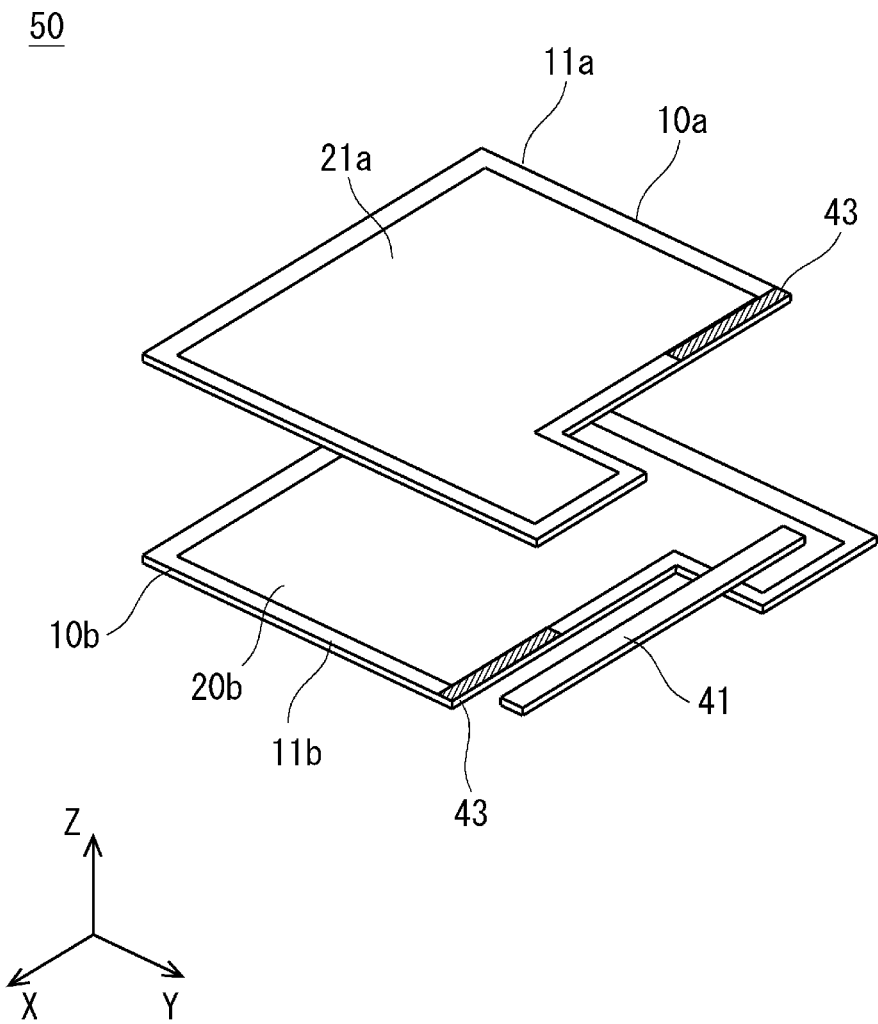
FIG. 13 is an exploded perspective view illustrating a structure of a sheet pair of the second embodiment.
Figure 14:
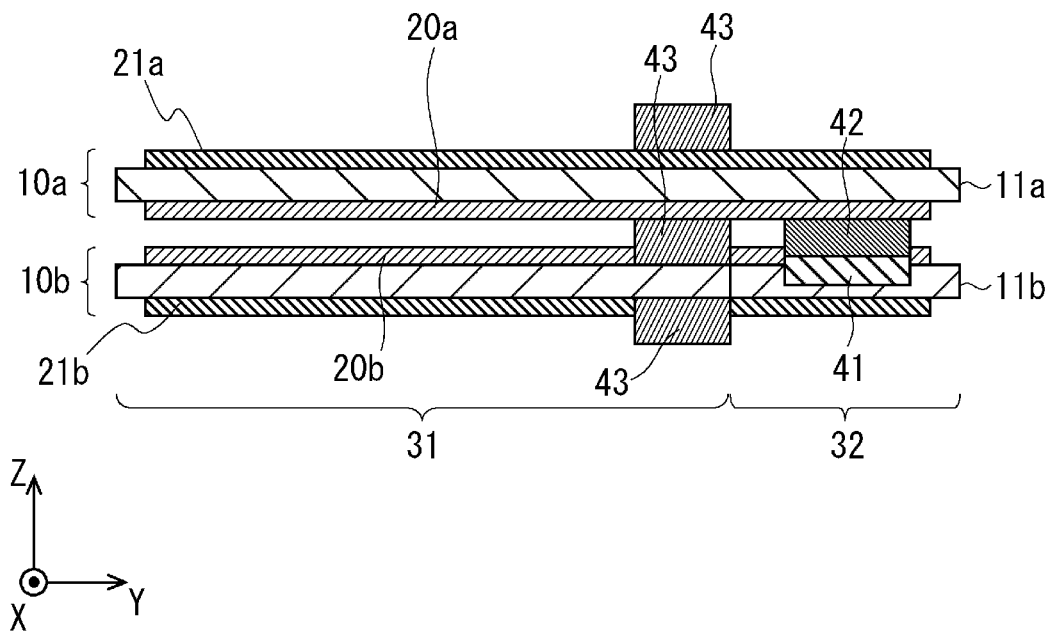
FIG. 14 is a YZ plane view illustrating a side structure of the sheet pair of the second embodiment.
Figure 15:
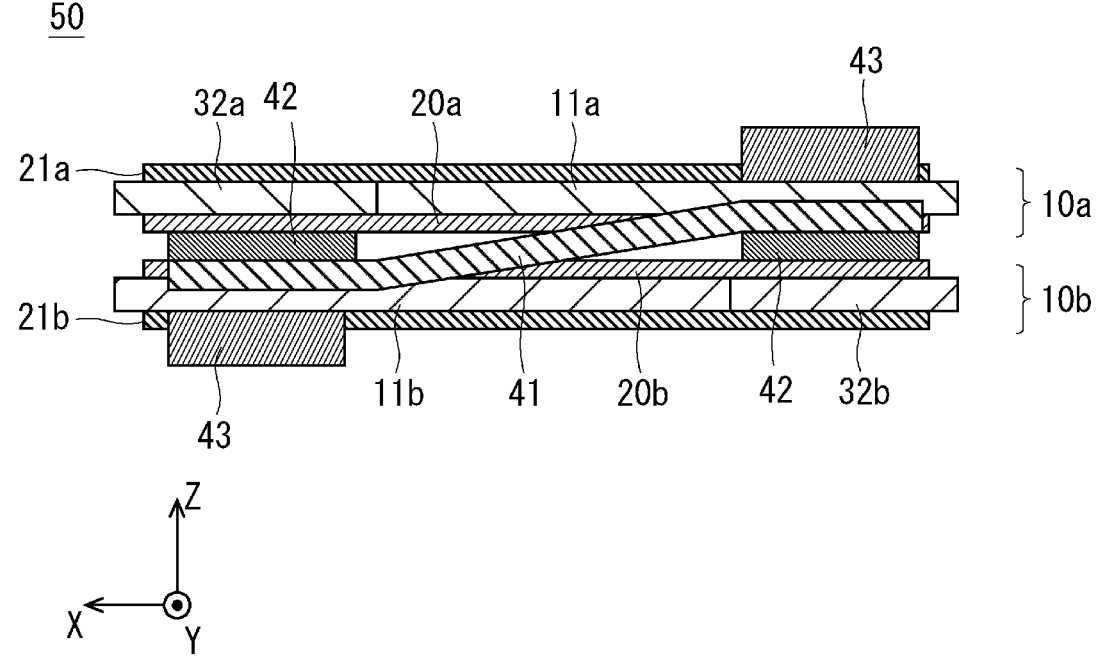
FIG. 15 is an XZ plane view illustrating a side structure of the sheet pair of the second embodiment.

Description will be provided on a structure of a sheet pair in which two sheet-shaped cells 10 of the present embodiment are layered with reference to FIGS. 13 to 15. FIG. 13 is an exploded perspective view illustrating a structure of a sheet pair 50. FIG. 14 is an XZ plane view illustrating the structure of the sheet pair 50. FIG. 15 is a YZ plane view illustrating a side structure of the sheet pair. Here, since the basic structure of the sheet pair 50 is similar to that of the sheet pair 50 of the first embodiment, redundant description thereof is skipped.

Since the insulating members 43 are arranged in the sheet pair 50 in which the sheet-shaped cells 10 of the present embodiment are layered, short-circuit can be prevented from occurring between the second electrode 15 and the substrate 11. Here, in the present embodiment, the insulating member 43 is also arranged on an upper face of the sheet-shaped cell 10 as well as on a lower face of the sheet-shaped cell 10. In the present embodiment, since the unit layers 20 are formed on both faces of the respective sheet-shaped cells 10a, 10b, capacity of the above can be further heightened.

Multilayer Cell

Figure 16:
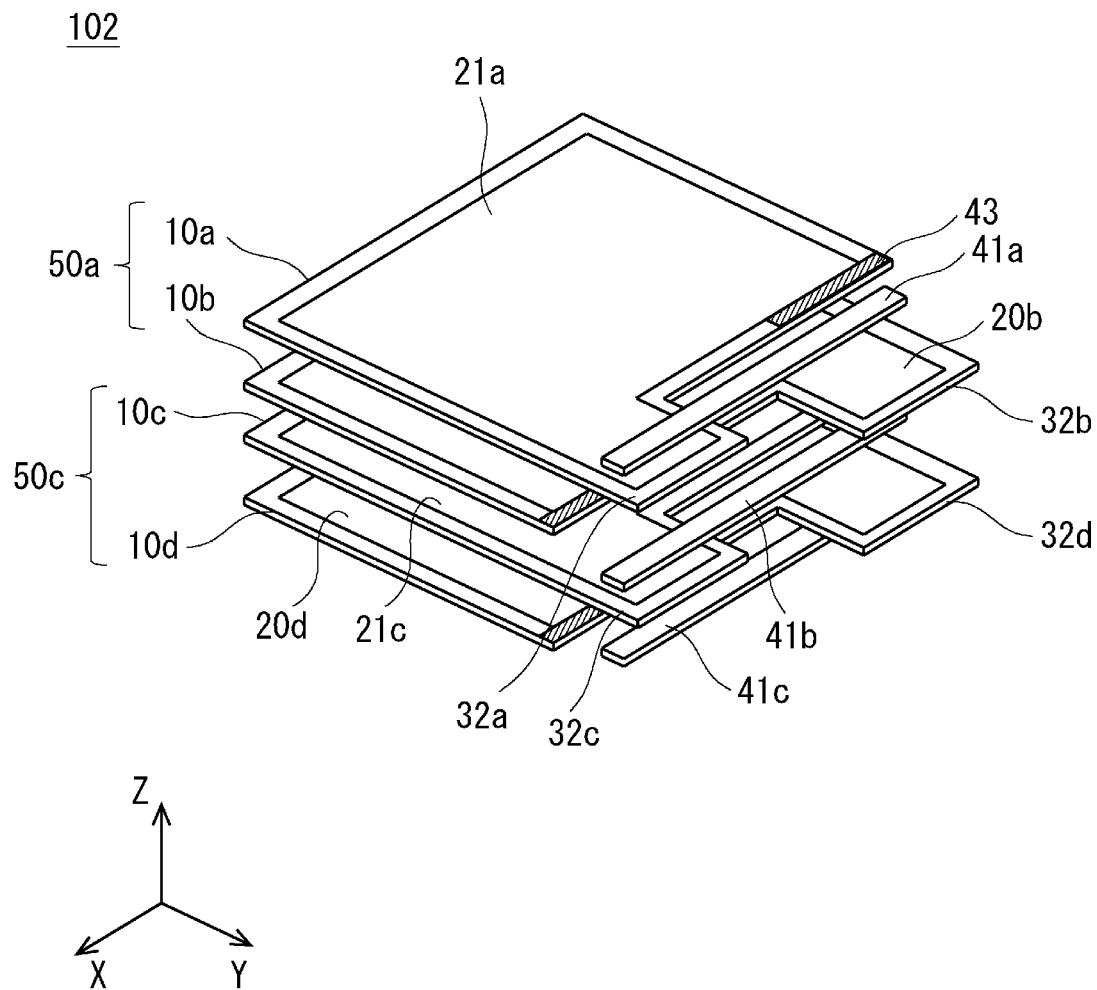
FIG. 16 is an exploded perspective view of a structure of a multilayer cell of the second embodiment.
Figure 17:
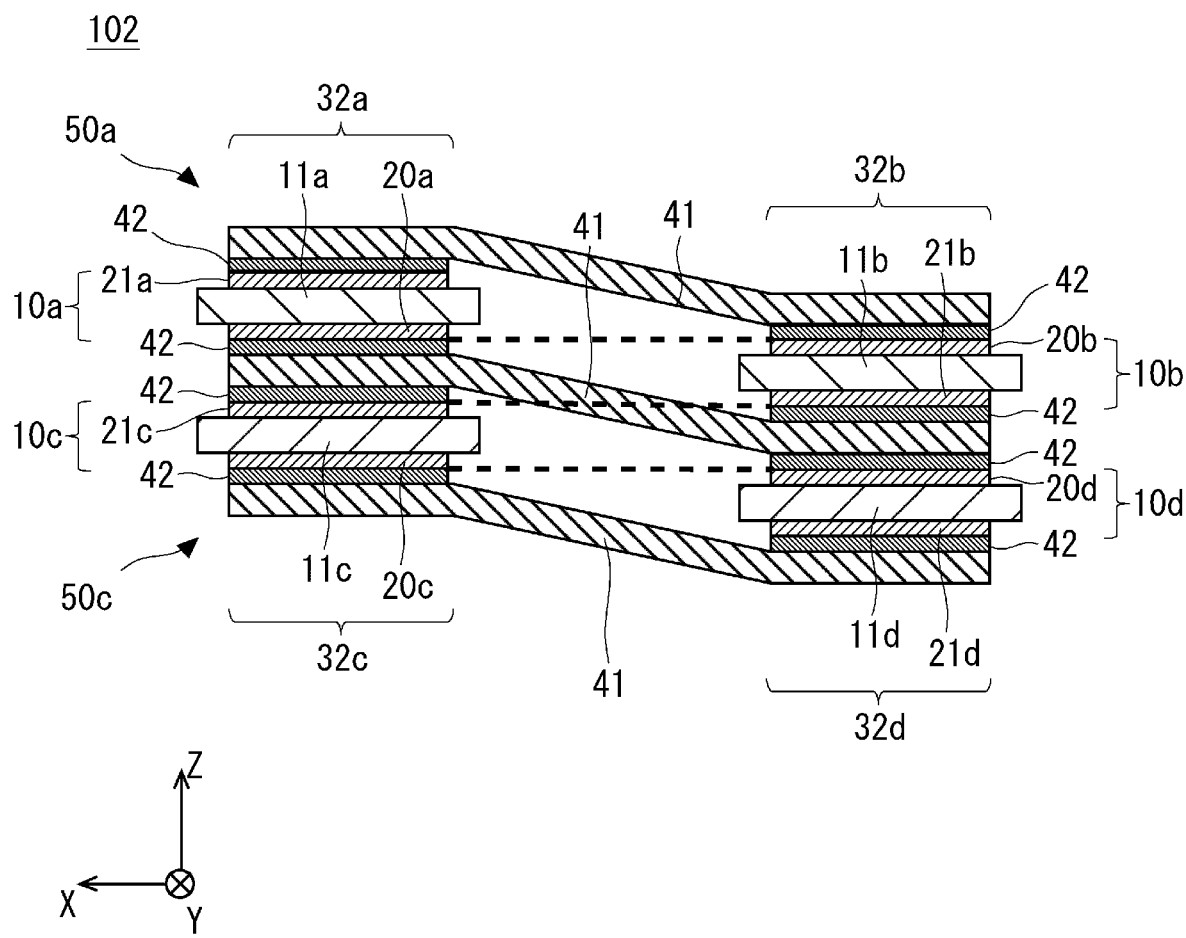
FIG. 17 is an XZ plane view illustrating a side structure of the multilayer cell of the second embodiment.

Description will be provided on a structure of a multilayer cell 102 in which the sheet pairs 50 are layered with reference to FIGS. 16 and 17. FIG. 16 is an exploded perspective view illustrating a structure of the multilayer cell 102. FIG. 17 is a sectional view illustrating the structure of the multilayer cell of FIG. 16 being an XZ plane view sectioned at the tab portions 32.

In FIGS. 16 and 17, two sheet pairs 50 are layered in the multilayer cell 102 and the two layered sheet pairs 50 are illustrated as the sheet pairs 50a, 50c. The sheet pair 50a includes sheet-shaped cells 10a, 10b. The sheet pair 50c includes sheet-shaped cells 10c, 10d. That is, the multilayer cell 102 includes the sheet-shaped cells 10a to 10d. Here, since the basic structure of the multilayer cell 102 is similar to that of the multilayer cell 100 of the first embodiment, redundant description thereof is skipped.

In the present embodiment, three tab leads 41a, 41b, 41c are arranged for the four sheet-shaped cells 10a to 10d. The tab lead 41a provides connection between a layer unit 21a and a layer unit 20b. The tab lead 41c provides connection between a layer unit 21d and a layer unit 20c. The tab lead 41b provides connection among a layer unit 20a, a layer unit 21b, a layer unit 21c, and a layer unit 20d. Joint members 42 are arranged on both faces of each tab lead 41 at both ends, respectively. As described above, the four sheet-shaped cells 10 each including the layer units 20, 21 on both faces are connected by the three tab leads 41. Thus, the sheet-shaped cells 10 can be easily connected in parallel while reducing the number of the tab leads 41.

Further, in the present embodiment as well, insulating members 43 are arranged on both faces of each of the sheet-shaped cells 10a to 10d. Accordingly, even though the sheet-shaped cells 10a to 10d each including the layer units 20, 21 on both faces are layered, short-circuit can be prevented from occurring between the second electrode 15 and the first electrode.

Further, in the present embodiment, the total thickness of the tab lead 41 and the joint members 42 is approximately the same as the thickness of the sheet-shaped cell 10. That is, the total thickness of the substrate 11 and the layer units 20, 21 arranged on both faces thereof is substantially the same as the total thickness of the tab lead 41 and the joint members 42 arranged on both faces thereof. According to the above, difference in thickness can be reduced even when the number of layered sheet pairs 50 is increased.

For example, in a case that difference exists in total thickness, height difference occurs between layers on a side of the tab leads 41 and layers on a side of the sheet-shaped cells 10 with increase of the number of layers. Occurrence of such height difference causes difficulty of layering. Further, distance between the tab leads is increased for finally welding or jointing all the extended tab leads 41. The above causes different stress to occur at an uppermost part, a lowermost part, and an intermediate part of the tab leads 41. Further, there is a fear that crinkle occur at the tab leads. In the present embodiment, owing to that the total thickness of the tab lead 41 and the joint members 42 is substantially matched with the thickness of the sheet-shaped cell 10, layering can be performed more easily.

Third Embodiment

Figure 18:
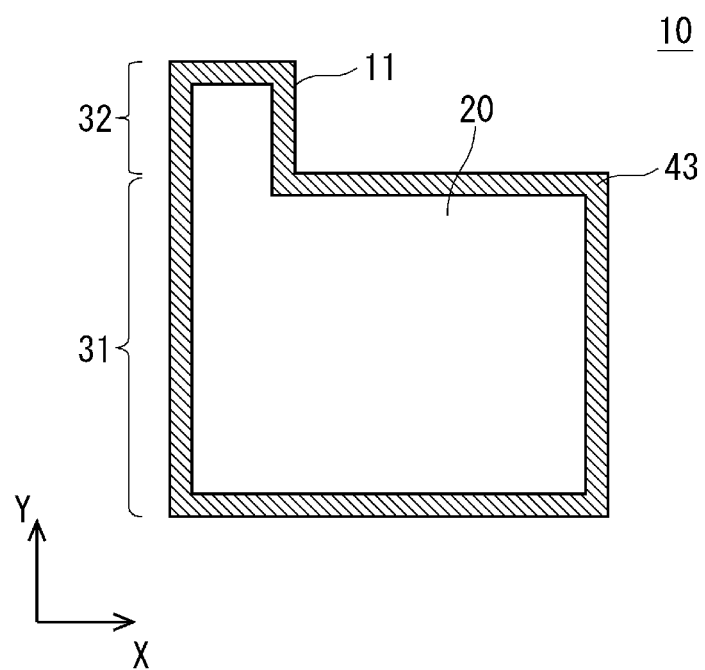
FIG. 18 is an XY plane view illustrating a structure of a sheet-shaped cell of a third embodiment.
Figure 19:
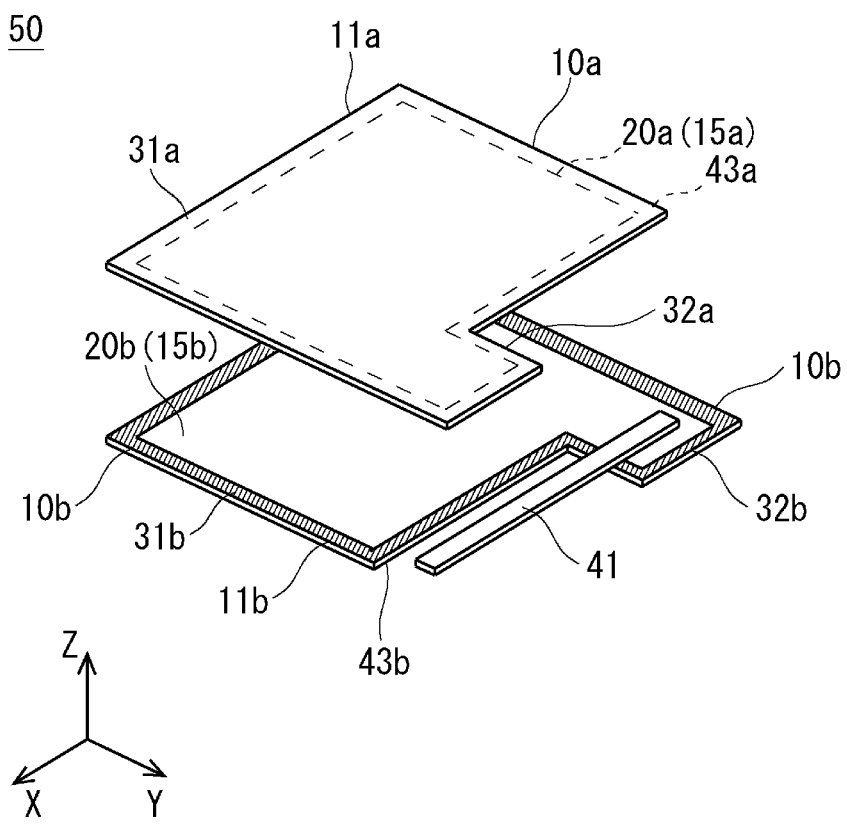
FIG. 19 is an exploded perspective view illustrating a structure of a sheet pair of the third embodiment.

Description will be provided on a sheet-shaped cell 10 and a sheet pair 50 of an embodiment with reference to FIGS. 18 and 19. FIG. 18 is a plane view illustrating a structure of the sheet-shaped cell 10. FIG. 19 is an exploded perspective view illustrating a structure of the sheet pair 50. In the present embodiment, only a structure of the insulating member 43 is different from that in the first embodiment. Here, since structures of other than the insulating member 43 are similar to those in the abovementioned embodiments, description thereof is appropriately skipped.

As illustrated in FIG. 18, the insulating member 43 is arranged on the entire outer circumference of the sheet-shaped cell 10. That is, on the XY plane, the insulating member 43 surrounds the layer unit 20 as being arranged continuously on the entire circumference of the sheet-shaped cell 10. The insulating member 43 is arranged on the frontmost face at the circumferential edge part of the substrate 11 and the layer unit 20 is arranged on the frontmost face at the center part. In such a structure as well, the insulating member 43b is located between the layer unit 20a at the tab portion 32a and the substrate 11b. Accordingly, occurrence of inter-electrode short-circuit can be prevented. Further, the insulating member 43a is located between the layer unit 20b at the tab portion 32b and the substrate 11a. Accordingly, occurrence of inter-electrode short-circuit can be prevented.

In the present embodiment, the insulating member 43 is arranged on the entire outer circumference of the sheet-shaped cell 10. Accordingly, occurrence of short-circuit can be prevented more reliably. Here, the structure of the insulating member 43 is not limited to the above. As long as being capable of preventing occurrence of inter-electrode short-circuit, it is possible to adopt minimum range arrangement described in the first and second embodiments or continuous arrangement on the entire outer circumference as described in the present embodiment. Naturally, the insulating member 43 may have a structure other than structures illustrated in the first to third embodiment. Further, it is also possible that an insulating member 43 is arranged on the entire circumference of the sheet-shaped cell 10 at a region of the multilayer cell 100 and an insulating member 43 is arranged only on a part of the outer circumference at another region thereof.

The first to third embodiments may be appropriately combined. For example, the modified example of the first embodiment and the second embodiment may be combined. Further, the structure of the insulating member 43 in the third embodiment may be combined with the first embodiment, the second embodiment, or the modified example thereof. That is, in the first and second embodiments as well, the insulating member 43 may be arranged in the entire outer circumference of the sheet-shaped cell 10. In the above description, an oxide semiconductor secondary cell is adopted as the sheet-shaped cell 10. However, it is also possible to adopt a cell other than an oxide semiconductor secondary cell. For example, it is also possible to adopt a sheet-shaped cell such as a lithium-ion cell.

Further, in the above, description is provided on an example of that the second electrode 15 serves as a positive electrode and the substrate (first electrode) 11 serves as a negative electrode. However, it is also possible that the second electrode 15 serves as a negative electrode and the substrate serves as a positive electrode. In this case, since the negative electrode is arranged on the frontmost face of the tab portion 32, the tab lead 41 connects negative electrodes.

In the above, description is provided on examples of the embodiments of the present invention. Here, the present invention includes appropriate modifications as long as not impairing objects and advantages thereof. Further, the present invention is not limited to the abovementioned embodiments.

This application is based upon and claims the benefit of priority from Japanese patent application No. 2016-000513, filed on Jan. 5, 2016, the disclosure of which is incorporated herein in its entirety by reference.

REFERENCE SIGNS LIST

10 Sheet-shaped cell
11 Substrate (First electrode)
12 N-type metal oxide semiconductor layer
13 Charging layer
14 P-type metal oxide semiconductor layer
15 Second electrode
16 Insulating layer
20 Layer unit 31 Rectangle portion
32 Tab portion
41 Tab lead
42 Joint member
43 Insulating member
50 Sheet pair
100 Multilayer cell

The invention claimed is:

1. A cell structure unit, comprising:
a first sheet-shaped cell that includes a first electrode and a second electrode;
a second sheet-shaped cell that includes a third electrode and a fourth electrode and that is arranged as facing the first sheet-shaped cell, the electrodes comprising planar sheets making up layers when viewed in a side view, wherein both the first and third electrodes comprise electrodes having a charge opposite that of both the second and fourth electrodes such that the first and third electrodes are connectable to a first terminal and the second and fourth electrodes are connectable to a second terminal, the first terminal having the charge opposite that of the second terminal; and
a tab lead that connects the second electrode of the first sheet-shaped cell and the fourth electrode of the second sheet-shaped cell,
wherein the second electrode of the first sheet-shaped cell and the fourth electrode of the second sheet-shaped cell are arranged as facing each other so that, in the side view, the first and third electrodes comprise layers with the second and fourth electrode layers therebetween,
wherein the cell structure unit comprises at least one semiconductor layer between the first electrode and the second electrode;
wherein, in a plane view perpendicular to the side view of a state that the first sheet-shaped cell and the second sheet-shaped cell are arranged as facing each other, the first sheet-shaped cell includes a first tab portion arranged as being extended to outside of the second sheet-shaped cell, the second sheet-shaped cell includes a second tab portion arranged as being extended to outside of the first sheet-shaped cell, and the tab lead is arranged from the first tab portion to the second tab portion,
wherein the first sheet-shaped cell includes a first rectangle portion that, along with the first tab portion, forms an L shaped first sheet-shaped cell when viewed in the plane view perpendicular to the side view,
wherein the second sheet-shaped cell includes a second rectangle portion that, along with the second tab portion, forms an L shaped second sheet-shaped cell when viewed in the plane view perpendicular to the side view, with the second rectangle portion overlapping the first rectangle portion in the plane view,
wherein the first tab portion and the second tab portion are offset to each other in the plane view,
wherein a first insulating member is arranged at the first sheet-shaped cell in a boundary between the second rectangle portion and the second tab portion in the plane view, and
wherein a second insulating member is arranged at the second sheet-shaped cell in a boundary between the first rectangle portion and the first tab portion in the plane view,
wherein the first insulating member is arranged at the first sheet-shaped cell in a vicinity of the second tab portion as to form an empty space gap between first sheet-shaped cell and the second sheet-shaped cell.

2. The cell structure unit according to claim 1, wherein the second insulating member is arranged at the second sheet-shaped cell in a vicinity of the first tab portion.

3. The cell structure unit according to claim 1, wherein thickness of the tab lead is equal to or smaller than that of each of the first sheet-shaped cell and the second sheet-shaped cell.

4. The cell structure unit according to claim 1,
wherein a first layer unit in which an n-type metal oxide semiconductor layer, a charging layer, a p-type metal oxide semiconductor layer, and the second electrode are layered in an order thereof arranged on the first electrode of the first sheet-shaped cell, and
a second layer unit in which an n-type metal oxide semiconductor layer, a charging layer, a p-type metal oxide semiconductor layer, and the fourth electrode are layered in an order thereof arranged on the third electrode of the second sheet-shaped cell.

5. The cell structure unit according to claim 4,
wherein the first layer unit is arranged on each of both faces of the first electrode of the first sheet-shaped cell, and
the second layer unit is arranged on each of both faces of the third electrode of the second sheet-shaped cell.

6. The cell structure unit according to claim 1, further comprising a joint member that joins the tab lead and the second electrode,
wherein each thickness of the first sheet-shaped cell and the second sheet-shaped cell are substantially the same as a total thickness of the joint member and the tab lead.

7. A multilayer cell in which a plurality of the cell structure units according to claim 1 are layered,
wherein a plurality of the first tab portions and the second tab portions are arranged in the multilayer cell,
the second electrode and the fourth electrode are arranged on first faces of the first tab portions, respectively, and insulating layers are arranged on second faces thereof, respectively, and
the second electrode and the fourth electrode are arranged on first faces of the second tab portions, respectively, and insulating layers are arranged on second faces thereof, respectively.

8. The multilayer cell according to claim 7, wherein, in two cell structural units adjacent one above the other, two first tab portions are arranged as facing each other and two second tab portions are arranged as facing each other.

9. The multilayer cell according to claim 7, wherein, in two cell structure units adjacent one above the other, two first tab portions are arranged as being shifted from each other and two second tab portions are arranged as being shifted from each other.

10. A multilayer cell in which a plurality of the cell structure units according to claim 5 are layered,
wherein a plurality of the first sheet-shaped cells, a plurality of the second sheet-shaped cells, and a plurality of tab leads are arranged,
joint members that join the tab leads to the second and fourth electrodes respectively are arranged, and
thickness of each of the first sheet-shaped cells and the second sheet-shaped cells is substantially the same as a total thickness of the joint member and the tab lead.

* * * * *